United States Patent [19]

Kaimann et al.

[11] 4,200,438
[45] Apr. 29, 1980

[54] GASIFICATION OF SOLID FUEL

[75] Inventors: Walter Kaimann, Rietberg; Karl-Heinz Brachthaüser, Ratingen, both of Fed. Rep. of Germany

[73] Assignee: Projektierung Chemische Verfahrenstechnik GmbH, Ratingen, Fed. Rep. of Germany

[21] Appl. No.: 941,367

[22] Filed: Sep. 11, 1978

[30] Foreign Application Priority Data

Sep. 20, 1977 [DE] Fed. Rep. of Germany ....... 2742222

[51] Int. Cl.² .............................................. C10J 3/20
[52] U.S. Cl. .......................................... 48/73; 48/76; 48/63; 48/202; 48/206; 201/31
[58] Field of Search ............... 48/73, 76, 77, 62 R, 48/63, 202, 206, 210, 197 R; 201/31

[56] References Cited

U.S. PATENT DOCUMENTS

| 2,582,712 | 1/1952 | Howard | 48/197 R |
| 3,190,245 | 6/1965 | Huntington | 48/63 |
| 3,981,690 | 9/1976 | Chen et al. | 48/73 |
| 4,043,766 | 8/1977 | Gernhardt et al. | 48/197 R |

FOREIGN PATENT DOCUMENTS

| 602376 | 5/1948 | United Kingdom . |
| 687917 | 2/1953 | United Kingdom . |
| 695191 | 8/1953 | United Kingdom . |
| 740027 | 11/1955 | United Kingdom . |
| 1312860 | 4/1973 | United Kingdom . |
| 1357248 | 6/1974 | United Kingdom . |
| 1361745 | 7/1974 | United Kingdom . |
| 1469625 | 4/1977 | United Kingdom . |

Primary Examiner—S. Leon Bashore
Assistant Examiner—George C. Yeung
Attorney, Agent, or Firm—Holman & Stern

[57] ABSTRACT

Solid fuel is acted on by a gasifying medium in a fluidized bed W. The resulting gas enters a cyclone 20 having an outlet for solid particles connected to a gasification chamber 30 in which the particles are gasified by a separate stream of gasifying medium supplied by an injector 25.

12 Claims, 3 Drawing Figures

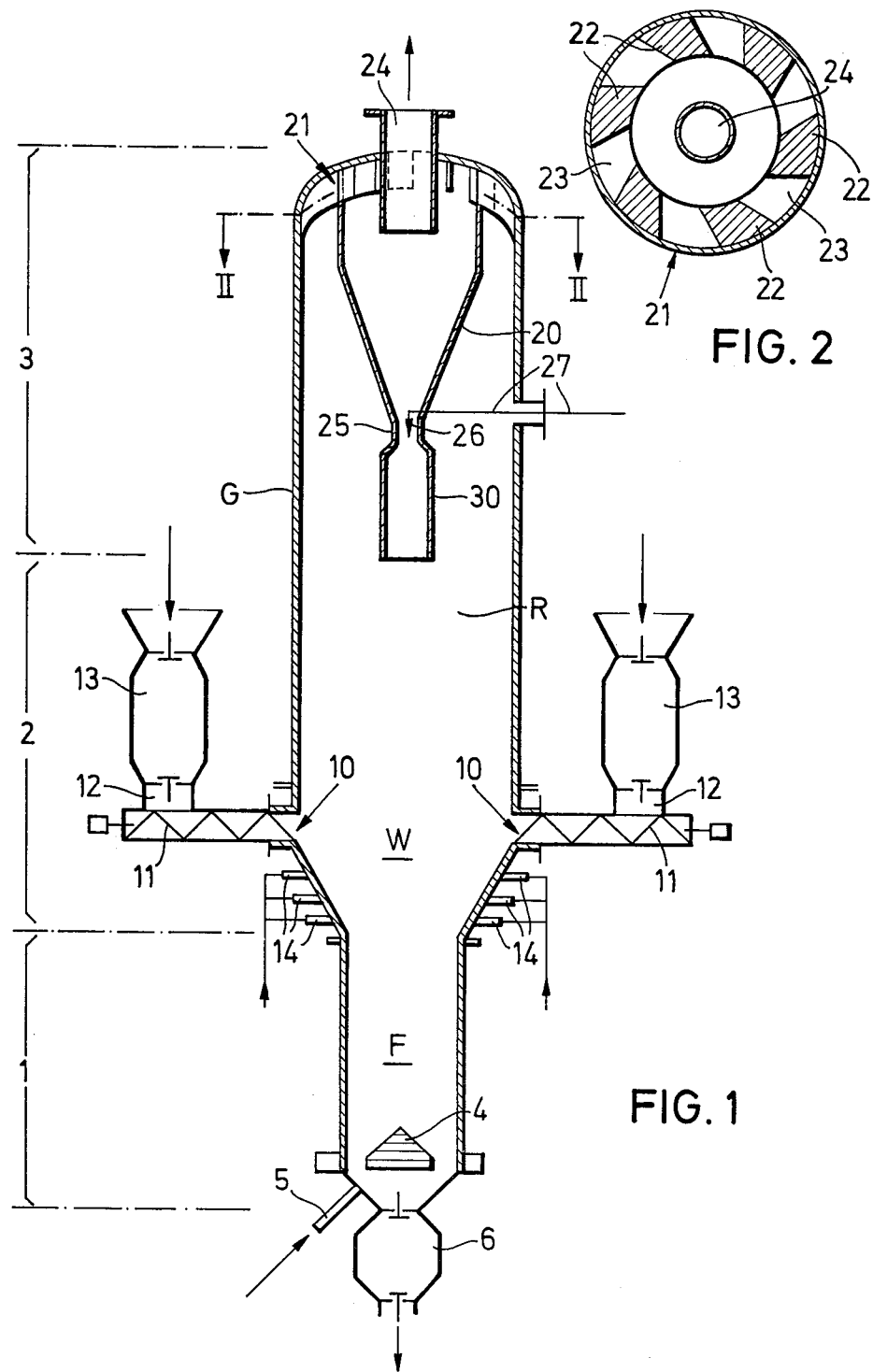

GASIFICATION OF SOLID FUEL

The invention relates to a method of producing gas from solid fuel by gasification with a gasifying medium in a reaction chamber with a fluidised bed, wherein solid particles contained in the gas rising from the fluidised bed are separated out by centrifugal force, and also relates to a generator for performing the method.

During the gasification of solid fuels in a turbulent layer (fluidised bed), fine particles are continuously rapidly carried away from the glowing fluidised bed by pneumatic conveyance effects. Since these particles are not gasified or only incompletely gasified, an undesirable carbon loss occurs. It is known to provide a cyclone in the path of the gas produced. It has also been proposed to dispose a cyclone in the generator vessel itself, in which case a guide track which is sealed from the interior space of the generator extends from the lower end of the cyclone and reaches into the fluidised bed in order to return the separated dust particles, as they are produced, to the fluidised bed.

Dust introduced into the fluidised bed is not further gasified to the desired degree, in particular since it is reluctant to react, but is carried out of the fluidised bed again in a largely non-gasified form, so that it loads the cyclone once more and, not least, influences the course of the gasification process itself in an unfavourable manner.

What is desired is a way of producing gas from solid fuels with the application of the fluidised bed principle which, inter alia, permits improved utilisation of the carbon contained in the fuel, effectively reduces the loading of the gas stream with solid particles, and permits a more favourable performance of the process.

The present invention provides a method of the kind referred to above, in which the particles separated out of the gas rising from the fluidised bed are introduced into a separate stream of gasifying medium and are gasified by the same separately from the fluidised bed.

Steam and oxygen are suitable gasifying media. The particles originating from the centrifugal separation process may be acted upon immediately by the stream of gasifying medium. The method permits gasification of the entire carbon content of the particles to be obtained. Thereby the fuel can be utilised considerably better than heretofore. Moreover, undesirable loading of the entire gasification process and in particular of the separating process, by repeatedly re-cycled fuel particles, is avoided.

Advantageously the gasification of the separated particles is performed at temperatures above the ash melting point, so that no dry solid ash particles are produced, but only liquid slag is obtained, which may drip down into the fluidised bed, where it cools, solidifies, and sinks down through the bed because of its relatively high density, being removed thereafter in a suitable manner by conventional means. Thus, there are no fine dry ash particles present which would be engaged by the gas rising from the fluidised bed and which would have to be separated out again.

A further advantage is that the heat produced by the separate gasification of the separated particles may be fully utilised. The hot gases can be made to deliver their sensible heat to the fluidised bed where this thermal energy has an advantageous influence on the endothermic gasification reactions.

This shows another advantage of the present invention when compared with conventional methods with fluidised bed gasification wherein the gas produced leaves the reaction chamber relatively cold.

The separate gasification of separated particles is performed with particular advantage in conjunction with a gasifying process which comprises fluidised bed gasification as well as a compact bed gasification within one and the same reaction chamber. This results in a very favourable process, not only in respect of the product, but also in respect of the performance in detail as far as the ash removal, which may be effected below the compact bed, preferably by means of a rotary grate.

Gasification is preferably performed under pressure. However, it is alternatively perfectly possible to operate without pressure (i.e. substantially at atmospheric pressure).

The invention also provides a generator for producing gas from solid fuel, comprising a generator vessel which contains a turbulent layer (fluidised bed) gasification zone and which is provided with at least one feed device for the fuel as well as with feed means for a gasifying medium, and in which a cyclone for separating out solid particles is arranged above the turbulent layer gasification zone; a gasification chamber is connected to the cyclone and comprises an injector to be fed with gasifying medium.

The gasification chamber may be connected to the cyclone by an intermediate member, but it is preferable for the gasification chamber to be connected directly to an outlet of the cyclone. The separated particles may then be engaged immediately by the stream of gasifying medium issuing from the injector, and thereby gasified.

The injector may be disposed directly in a transition region between the cyclone and the gasification chamber or even in the outlet of the cyclone. Furthermore the injector may comprise an outlet nozzle which is arranged inclined in relation to a longitudinal axis of the gasification chamber and/or an outlet nozzle disposed eccentrically, or may itself be inclined and/or arranged eccentrically. The movement of the particles during the gasifying process can be influenced thereby in a favourable manner, in particular being subjected to a continuation of the helical or spiral motion which the particles have received within the cyclone.

The cyclone is preferably located at the uppermost point of the generator vessel or in a head portion of the vessel. It may be designed in accordance with the aerodynamic requirements, the gas velocities, and the magnitude of the particles carried by the gas, in a manner familiar to the expert. It consists of highly heat resistant material, such as steel or ceramic material. Arranging the cyclone within the generator vessel has the advantage that its walls need not withstand a pressure loading, even if the gasifying process is performed under pressure.

It may be advantageous to provide the cyclone with an inlet device by which the gas is introduced into the cyclone in a particularly favourable manner. Such an inlet device comprises, e.g., passages regularly distributed over the periphery of the cyclone arrangement and is constructed in particular in the manner of a crown of guide vanes or is provided with such vanes.

For the purpose of conducting the product gas away, a gas outlet duct is preferably provided which extends upwards from the cyclone. This duct may in particular extend from the cyclone in the direction of the axis of the cyclone.

The generator may be a pure fluidised bed generator, but it is preferable for the cyclone to be arranged, together with the gasification chamber, above a combined fluidised bed and compact bed gasifying system.

The invention will be described further, by way of example only, with reference to the accompanying drawings, in which:

FIG. 1 diagrammatically illustrates a gas generator in vertical longitudinal section;

FIG. 2 is a section on the line II—II in FIG. 1; and

Figure 3:
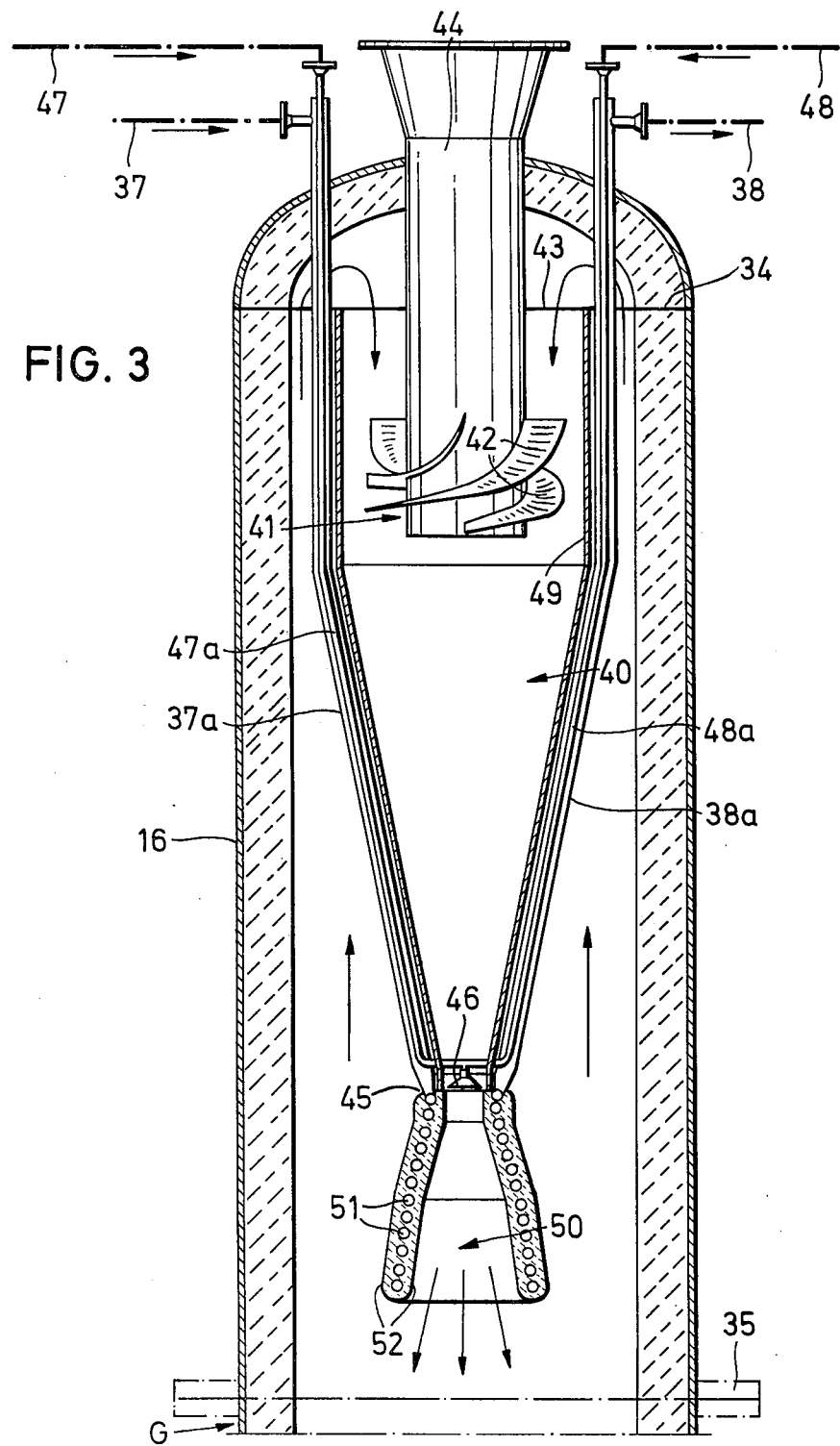
FIG. 3 illustrates a head portion of a gas generator, in vertical longitudinal section, on an enlarged scale.

The gas generator illustrated in FIGS. 1 and 2 comprises a generator vessel G which encloses a reaction chamber R and which contains a turbulent layer (fluidised bed) gasifying zone W, in a middle portion 2, and therebelow a compact bed gasifying zone F in a lower portion 1. This means that, in one and the same generator vessel G, a compact bed generator (zone F) and a fluidised bed generator (zone W) are provided in connection with each other.

The compact bed zone F, for gasifying solid fuel in a quiescent or nearly quiescent layer, is in the form of a duct and is provided with a rotary grate 4 of known kind. A feed pipe 5 supplies the rotary grate 4 with a gasifying medium (e.g. air or oxygen and/or steam, dependently upon the gasification process to be performed or the desired gas). A gate 6 of known kind serves for removing gasification residues from the compact bed gasifying zone F.

In the turbulent layer gasifying zone W following the zone F, inlets 10 for solid fuel are provided. The inlets, 10 are supplied by fuel feed devices each comprising a drivable feed worm 11 arranged at the lower end of a fuel hopper 13 which the fuel enters through a gate 13 of known kind. Instead of a feed worm another device for introducing the fuel may be provided, e.g. a slide or a vibratory conveyor.

A plurality of annularly distributed feed pipes 14 for a gasifying medium (e.g. air, oxygen, steam) are disposed below the fuel inlet 10. The pipes 14 open into the zone W at different levels, as may be seen from the drawing. The portion 2 of the vessel G, including the turbulent layer gasifying zone W, has an upwardly enlarging, in particular conical, internal cross-section. The shape of this portion 2 and the cross-section of its upper and lower ends are so selected that granular fuel having a given grain-size spectrum is maintained in the turbulent (fluidised) state under the influence of the gasifying medium introduced as well as the gases which rise from the compact bed gasifying zone F.

The vessel G is closed and is so constructed that gas production may be performed under elevated internal pressure. However, the operation may alternatively be effected without pressure elevation. When only the latter type of operation comes into consideration, the gates 6 and 13 may under certain circumstances be omitted or other devices substituted for them.

A cyclone 20 is disposed centrally in the upper portion 3 of the vessel G; it operates according to the centrifugal force principal in the usual manner and serves in the present case for the separation of solid particles from the gas rising from the fluidised bed (zone W). The gas carrying the particles enters the cyclone 20 through an inlet 21 which comprises, e.g. passages 23 delimited by stationary guide vanes 22, as illustrated in FIG. 2. The gas, relieved of the separated particles, leaves the generator through an outlet duct or tube 24 disposed along the axis of the cyclone 20.

The cyclone 20 is connected to a gasification chamber 30, the separated-particle outlet 25 of the cyclone forming a transition region to the gasification chamber 30. An injector 26 is arranged in the transition region 25 and is indicated diagrammatically by an arrow; a gasifying medium, in particular superheated steam and oxygen, is supplied to the injector 26 from outside the vessel G through a pipe 27, at a pressure which is appropriately higher than the pressure in the reaction chamber R. The particles separated out in the cyclone 20 are met in the outlet 25 of the cyclone by the jet of gasifying medium issuing from the injector 26 and are subjected to gasification in the chamber 30. Thereby the entire carbon content of these particles is gasified at temperatures above the ash melting point, e.g. in a range of about 1300° to 1500° C.

The entire ash content of the particles is molten and may be absorbed by liquid slag present already on the wall of the gasification chamber 30, and falls down in the form of drops into the fluidised bed (zone W). There the residues sink down and find their way through the compact bed zone F to the rotary grate 4 through which (together with the other residues) they travel to the rotary gate 6, in order to be discharged. (Instead of a rotary grate, any other suitable withdrawal device for the residues may be provided). Thus, in consequence of the high temperature gasification in the chamber 30, there occur no dry ash particles which would be entrained by the gas stream rising from the fluidised bed and which would have to be separated again in the cyclone. Furthermore there is the advantage that the hot jet from the chamber 30 heats the fluidised bed additionally.

Differing from the embodiment illustrated, the generator may alternatively be constructed as a mere fluidised bed generator (Winkler generator), in which case then the lower portion 1 in FIG. 1 (including the compact bed) is to be assumed absent. In this case a suitable discharge device for the gasification residues is then present below the fluidised bed (zone W), e.g. a liquid slag remover.

FIG. 3 illustrates an advantageous embodiment of the uppermost region of a generator. In this case the head portion 16 may form the closure of a pure fluidised bed generator, as just mentioned, or may be part of a combined generator of the kind illustrated in FIG. 1.

In the centre of the head portion 16 a cyclone 40 having a casing 49 of suitable material (e.g. steel or ceramic) is mounted. The open upper end 43 of the cyclone 40 (or under certain circumstances a number of lateral openings in the cyclone) receives the gas which rises from fluidised bed (not illustrated, lying below) in the direction of the arrows shown. Rotation is imparted to the gas by an inlet device 41 having helical or spiral guide vanes 42. The lower end of the cyclone 40, forming the separated-particle outlet, is connected through a transition regior 45 directly to a gasification chamber 50 which widens downwards in a funnel-like manner and is provided with a cooling system. In the illustrated embodiment the cooling system comprises a tube coil 51 which is surrounded by a protective refractory coating 52 and through which cooling water flows. The cooling water is supplied through a conduit 37 which has a portion 37a running along the cyclone 40 and connected to one end of the tube coil 51. After passing through the tube coil 51 the water flows through a discharge pipe 38 having a portion 38a running along the cyclone 40.

An injector 46, having one or more nozzles (which under certain circumstances may be inclined relatively to the cyclone axis and/or arranged eccentrically relatively thereto), is located in the transition region 45. Two pipe lines 47 and 48 lead from above the generator vessel G to the injector 46 and are led through the cooling water pipe portions 37a and 38a by their portions 47a and 48a running along the cyclone 40; the line 47 may serve for the supply of oxygen and the line 48 for the supply of steam to the injector 46. The portions 37a, 47a and 38a, 48a each constitute coaxial arrangements of tubes in such manner that the path for the gasifying medium (oxygen, steam) is surrounded by the path for the cooling water like a jacket. This constitutes a particularly advantageous embodiment.

The gasification of the particles arriving from the cyclone 40 in the chamber 50 occurs in the manner as previously explained in conjunction with FIG. 1. The issue of the product gas (relieved of solid particles) from the cyclone 40 is effected through a centrally arranged outlet tube 44.

Various possibilities exist for constructional realisation in detail, e.g. for the mounting, support, or suspension of the cyclone 40 in the head portion, suitable means are available to the expert for this purpose. The head portion 16 may comprise at its upper end a tightly fixable cover, as is indicated merely diagrammatically by the separation plane 34; after removal of the cover the cyclone in its totality is accessible for servicing. Alternatively a closure flange or access opening of smaller magnitude may be provided which permits important parts of the cyclone to be assembled or dismantled.

The head portion 16 may directly be a part of the generator vessel or even form a unit by itself which is placed upon the generator vessel proper and is sealingly connected thereto, for example by means of a flange connection 35 illustrated by a dash-dotted line in FIG. 3.

Furthermore the head portion containing the cyclone together with the gasification chamber connected thereto may be constructed as a unit which may be placed upon the generator vessel and connected thereto, and (differing from the embodiment according to FIG. 3) does not comprise an annular space completely surrounding the cyclone, for the rising gas, but is provided with individual gas guide ducts, for example two tubes of appropriate cross-section disposed diametrically opposite each other relatively to the cyclone, which terminate in the top of the cyclone. The functioning is the same as that discussed above in conjunction with the other embodiment. In this case the cyclone can be kept free of the immediate external effect of hot gases. Also the feed pipes for gasifying media may be arranged differently. In such a construction, the individual gas guide ducts, as well as the region which (in the construction according to FIG. 3) surrounds the cyclone directly and guides the rising gases to the inlet of the cyclone, belong directly to the generator system and, when elevated pressure gasification is applied, are also designed for the same pressure as the remaining part of the generator. Therefore, it applies also to such a construction that the separation of the gas particles from the gas stream takes place within the reaction chamber, in spite of the fact that the head portion is not in one piece with the generator vessel proper, but forms a unit attached thereto which may be mounted by itself, and that individual parallel paths are present for the rising gas to be guided to the cyclone.

We claim:

1. A method of producing gas from solid fuel, comprising:
gasifying solid fuel with a gasifying medium in a fluidised bed in a single reaction chamber; separating solid particles out from the gas rising from the fluidised bed by centrifugal force in a cyclone arranged within said chamber and above said fluidised bed having an outlet axially aligned with said reaction chamber; gasifying the separated particles immediately downstream of said outlet in a co-current separate stream of gasifying medium in a gasification chamber disposed below said outlet, whereby the particles are gasified separately from the fluidised bed; and allowing the molten reaction products of said separated particles to stream directly into said fluidised bed.

2. A method as claimed in claim 1, in which gasification is performed under pressure.

3. A generator for producing gas from solid fuel, comprising a generator vessel defining a single reaction chamber which contains a fluidised bed gasification zone, said vessel having an uppermost portion, means for feeding solid fuel into the reaction chamber, means for feeding a gasifying medium into the fluidized bed gasification zone, a cyclone arranged within said vessel and above the fluidised bed gasification zone for separating solid particles from the gas rising from the said zone having an outlet for said separated particles axially aligned with said chamber, a gasification chamber connected to said outlet immediately downstream of and below the cyclone above said fluidised bed so as to receive the separated particles, and an injector operatively associated with said gasification chamber for supplying a stream of gasifying medium to the gasification chamber co-currently with the flow of the separated particles, said gasification chamber opening towards said reaction chamber containing said fluidised bed gasification zone for directly streaming the molten reaction products thereinto.

4. A generator as claimed in claim 3 further comprising means for defining a transition region between the cyclone and the gasification chamber said injector being arranged in said region.

5. A generator as claimed in claim 3 wherein the cyclone is arranged in the uppermost portion of the generator vessel.

6. A generator as claimed in claim 3 wherein the cyclone is provided with an inlet device for imparting rotation to said gas rising from said fluidised bed.

7. A generator as claimed in claim 6, wherein the inlet device comprises guide vanes.

8. A generator as claimed in claim 3 including a gas outlet duct extending upwardly from the cyclone.

9. A generator as claimed in claim 8, wherein said cyclone having an axis and the gas outlet duct extends from the cyclone along the axis thereof.

10. A generator as claimed in claim 3, including a compact bed gasification zone in the reaction chamber, below the fluidised bed gasification zone.

11. A generator as claimed in claim 3, including a cooling system for the gasification chamber having at least one cooling medium pipe having an interior.

12. A generator as claimed in claim 11, including at least one gasifying medium feed pipe arranged in the interior of said at least one cooling medium pipe of the cooling system.

* * * * *